United States Patent
Carteri et al.

(10) Patent No.: US 11,689,568 B2
(45) Date of Patent: Jun. 27, 2023

(54) DYNAMIC MAZE HONEYPOT RESPONSE SYSTEM

(71) Applicant: International Business Machines Corporation, Armonk, NY (US)

(72) Inventors: Francesco Maria Carteri, Rome (IT); Roberto Ragusa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 16/869,928

(22) Filed: May 8, 2020

(65) Prior Publication Data

US 2021/0352103 A1 Nov. 11, 2021

(51) Int. Cl.
*H04L 29/06* (2006.01)
*H04L 12/715* (2013.01)
*H04L 9/40* (2022.01)
*H04L 45/64* (2022.01)

(52) U.S. Cl.
CPC .......... *H04L 63/1491* (2013.01); *H04L 45/64* (2013.01); *H04L 63/1416* (2013.01); *H04L 63/1433* (2013.01)

(58) Field of Classification Search
CPC ............. H04L 63/1491; H04L 63/1433; H04L 63/1416; H04L 45/64
See application file for complete search history.

(56) References Cited

U.S. PATENT DOCUMENTS

| | | | |
|---|---|---|---|
| 7,694,339 B2 | 4/2010 | Blake | |
| 8,650,215 B2 | 2/2014 | Little | |
| 9,565,202 B1* | 2/2017 | Kindlund | G06F 21/567 |
| 9,602,536 B1* | 3/2017 | Brown, Jr. | H04L 63/1491 |
| 9,716,727 B1* | 7/2017 | Seger | H04L 63/1491 |
| 9,882,929 B1* | 1/2018 | Ettema | H04L 63/145 |
| 2011/0214182 A1* | 9/2011 | Adams | G06F 21/54 726/23 |
| 2017/0149825 A1* | 5/2017 | Gukal | H04L 63/1491 |

(Continued)

FOREIGN PATENT DOCUMENTS

| | | |
|---|---|---|
| CN | 103051615 B | 4/2013 |
| CN | 108199871 A | 6/2018 |

(Continued)

OTHER PUBLICATIONS

Disclosed Anonymously, "Automated Protection of Software Defined Systems", An IP.com Prior Art Database Technical Disclosure, IP.com No. IPCOM000250430D, IP.com Electronic Publication Date: Jul. 13, 2017, 7 pages.

(Continued)

*Primary Examiner* — Joseph P Hirl
*Assistant Examiner* — Thomas A Gyorfi
(74) *Attorney, Agent, or Firm* — Stephanie L. Carusillo

(57) ABSTRACT

In several aspects of the present invention, a processor receives, from a rule-based intrusion detection system, an intercepted request sent by a hacker. A processor analyzes the intercepted request to determine, in part, a type of service and a type of hacker. A processor builds a first layer of a honeypot maze based on the analyzed intercepted request. A processor simulates the first layer of the honeypot maze to the hacker. A processor iteratively builds additional layers of the honeypot maze based on additional intercepted requests from the hacker.

20 Claims, 4 Drawing Sheets

(56) References Cited

U.S. PATENT DOCUMENTS

| | | | |
|---|---|---|---|
| 2017/0230336 A1* | 8/2017 | Bingham | H04L 63/1491 |
| 2017/0364794 A1* | 12/2017 | Mahkonen | H04L 43/10 |
| 2018/0103047 A1* | 4/2018 | Turgeman | H04L 63/08 |
| 2019/0058733 A1* | 2/2019 | Wright | H04L 63/1491 |
| 2020/0186567 A1 | 6/2020 | Hebert | |
| 2020/0389469 A1* | 12/2020 | Litichever | H04L 63/1425 |
| 2021/0194925 A1* | 6/2021 | Xiao | H04L 63/0227 |

FOREIGN PATENT DOCUMENTS

| | | |
|---|---|---|
| CN | 109246108 A | 1/2019 |
| CN | 109361670 A | 2/2019 |
| CN | 106534195 B | 10/2019 |
| KR | 20180115726 A | 10/2018 |

OTHER PUBLICATIONS

Garg et al., "Deception in Honeynets: A Game-Theoretic Analysis", Proceedings of the 2007 IEEE, Workshop on Information Assurance United States Military Academy, West Point, NY, Jun. 20-22, 2007, 7 pages.

Bockermann et al., "Learning SQL for Database Intrusion Detection Using Context-Sensitive Modelling", DIMVA 2009, 8 pages.

Github, Github.com, [online]; [retrieved on Nov. 9, 2020]; Retrieved from the Internet: https://github.com/paralax/awesome-honeypots.

Hackernoon, HackerNoon, [online]; [retrieved on Nov. 9, 2020]; retrieved from the Internet: https://hackernoon.com/poison-records-acra-eli5-d78250ef94f.

IBM Appendix P, list of patents and patent applications to be treated as related, Filed Herewith, 2 pages, (Year: 2020).

Miairh et al., "Honeypot in Network Security: A Survey", Proceedings of the 2011 International Conference of Communication, Computing & Security (ICCCS '11), 2011, 6 pages.

Pouget et al., "Honeypot-based Forensics", AusCERT Aisa Pacific Information Technology Security Conference, 2004, 15 pages.

Provos, Niels, "A Virtual Honeypot Framework", USENIX Security Symposium, vol. 173, No. 2004, 2004, 14 pages.

Simioni et al., U.S. Appl. No. 17/104,013, filed Nov. 25, 2020.

\* cited by examiner

| Port scanned by hacker | Service target | Skill profile | Type of honeypot to build |
|---|---|---|---|
| 80 | Web server | HTTP attacker | Provision an Apache Web server with known vulnerability |
| 22 | SSH | Command Shell attacker | Provision Docker container with SSH vulnerability |

FIG. 3

DYNAMIC MAZE HONEYPOT RESPONSE SYSTEM

BACKGROUND

The present invention relates generally to the field of honeypots, and more particularly to building a dynamic maze honeypot system in response to a series of requests sent by a hacker.

A honeypot is a computer security mechanism set to detect, deflect, or, in some manner, counteract attempts at unauthorized use of information systems. Generally, a honeypot consists of data (e.g., in a network site) that appears to be a legitimate part of the site, but is actually isolated and monitored, and that seems to contain information or a resource of value to attackers, who are then blocked.

Honeypots can be classified based on their deployment (use/action) and based on their level of involvement. Based on deployment, honeypots may be classified as production honeypots or research honeypots.

Production honeypots are easy to use, capture only limited information, and are used primarily by corporations. Production honeypots are placed inside the production network with other production servers by an organization to improve their overall state of security. Normally, production honeypots are low-interaction honeypots, which are easier to deploy. They give less information about the attacks or attackers than research honeypots.

Research honeypots are run to gather information about the motives and tactics of the attacker community targeting different networks. These honeypots do not add direct value to a specific organization; instead, they are used to research the threats that organizations face and to learn how to better protect against those threats. Research honeypots are complex to deploy and maintain, capture extensive information, and are used primarily by research, military, or government organizations.

Based on design criteria, honeypots can be classified as pure honeypots, high-interaction honeypots, or low-interaction honeypots.

Pure honeypots are full-fledged production systems. The activities of the attacker are monitored by using a bug tap that has been installed on the honeypot's link to the network. No other software needs to be installed. Even though a pure honeypot is useful, stealthiness of the defense mechanisms can be ensured by a more controlled mechanism.

High-interaction honeypots imitate the activities of the production systems that host a variety of services and, therefore, an attacker may be allowed a lot of services to waste their time. By employing virtual machines, multiple honeypots can be hosted on a single physical machine. Therefore, even if the honeypot is compromised, it can be restored more quickly. In general, high-interaction honeypots provide more security by being difficult to detect, but they are expensive to maintain. If virtual machines are not available, one physical computer must be maintained for each honeypot, which can be exorbitantly expensive.

Low-interaction honeypots simulate only the services frequently requested by attackers. Since they consume relatively few resources, multiple virtual machines can easily be hosted on one physical system, the virtual systems have a short response time, and less code is required, reducing the complexity of the virtual system's security.

A 'honeynet' is a network of high interaction honeypots that simulates a production network and is configured such that all activity is monitored, recorded and in a degree, discreetly regulated. Typically, a honeynet is used for monitoring a larger and/or more diverse network in which one honeypot may not be sufficient. Honeynets and honeypots are usually implemented as parts of larger network intrusion detection systems.

SUMMARY

According to one embodiment of the present invention, a method, computer program product, and computer system for building a dynamic maze honeypot system in response to a series of requests sent by a hacker is provided. A processor receives an intercepted request sent by a hacker. A processor analyzes the intercepted request to determine, in part, a type of service and a type of hacker. A processor builds a first layer of a honeypot maze based on the analysis of the intercepted request. A processor simulates the first layer of the honeypot maze to the hacker. A processor iteratively builds additional layers of the honeypot maze based on additional intercepted requests from the hacker.

BRIEF DESCRIPTION OF THE DRAWINGS

FIG. 3 is an exemplary table depicting hacker skill profiles and corresponding honeypot mazes to build.

DETAILED DESCRIPTION

Embodiments of the present invention recognize the need to prevent a malicious user (i.e., hacker) from entering an information computing system, e.g., a preproduction/production environment in which the hacker would be able to move around the environment and get to the production machines. The use of a honeypot or fixed honeynet that is prepared before the hacker enters the environment to force the hacker to waste as much time as possible exploring a personalized fake environment is recognized by embodiments of the present invention.

Embodiments of the present invention analyze the behavior and techniques used by the hacker and dynamically and iteratively build, on the fly, a honeypot based on the analyzed behaviors and techniques of the hacker. For example, if the hacker is running a port scanning on specific ports, i.e., windows service ports, embodiments of the present invention build a personalized honeypot of windows subnets. In another example, if the hacker is looking for virtualizers and specific storages, embodiments of the present invention build a personalized honeypot of specific ports and protocols opened.

Embodiments of the present invention dynamically and iteratively build the honeypot maze using microservices, which allow for quick provisioning and are cost efficient. Embodiments of the present invention dynamically and iteratively build the honeypot maze by leveraging a Software-Defined Networking (SDN) approach that can quickly create a fake network segment with their related network host and devices, i.e., can dynamically define which hosts and connections are on the fake network segment for hacker to explore.

The present invention will now be described in detail with reference to the Figures.

Figure 1:
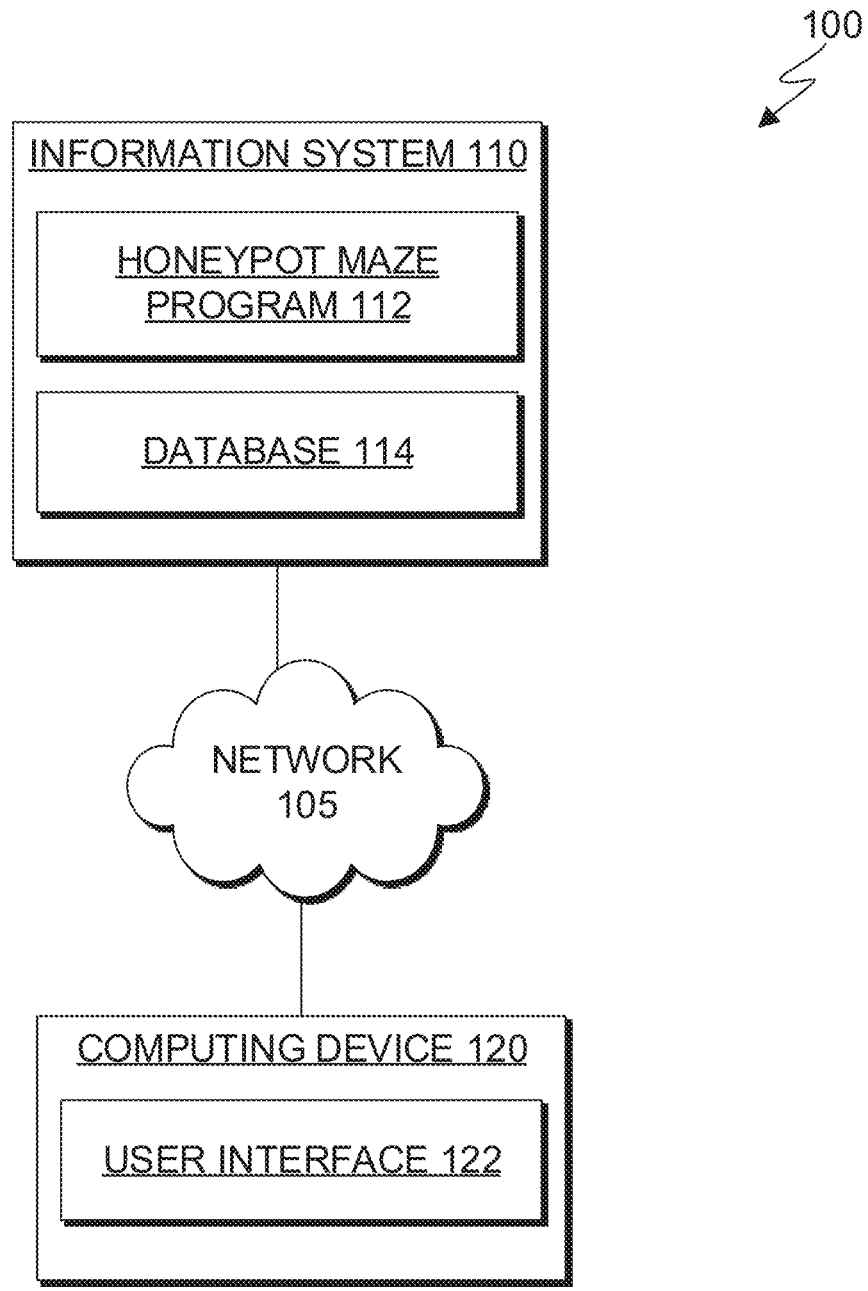
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one embodiment of the present invention and does not imply any limitations with regard to the environments in which different embodiments may be implemented. Many modifications to the depicted environment may be made by those skilled in the art without departing from the scope of the invention as recited by the claims.

Distributed data processing environment 100 includes information system 110 and computing device 120 interconnected over network 105. Network 105 can be, for example, a local area network (LAN), a wide area network (WAN) such as the Internet, or a combination of the two, and can include wired, wireless, or fiber optic connections. Network 105 can include one or more wired and/or wireless networks that are capable of receiving and transmitting data, voice, and/or video signals, including multimedia signals that include voice, data, and video information. In general, network 105 can be any combination of connections and protocols that will support communications between information system 110 and computing device 120. Distributed data processing environment 100 may include additional servers, computers, or other devices not shown.

Information system 110 operates as an information system that a hacker is trying to get information from, e.g., production information from a production information system. In the depicted embodiment, information system 110 contains honeypot maze program 112 and database 114. In some embodiments, information system 110 can be a standalone computing device, a management server, a web server, a mobile computing device, or any other electronic device or computing system capable of receiving, sending, and processing data. In some embodiments, information system 110 may be a laptop computer, tablet computer, netbook computer, personal computer (PC), a desktop computer, a smart phone, or any programmable electronic device capable of communicating with computing devices (not shown) via network 105. In other embodiments, information system 110 represents a server computing system utilizing multiple computers as a server system, such as a cloud computing environment. In yet other embodiments, information system 110 represents a computing system utilizing clustered computers and components (e.g., database server computers, application server computers, etc.) that act as a single pool of seamless resources when accessed within distributed data processing environment 100. Information system 110 may include components as described in further detail in FIG. 4.

Honeypot maze program 112 operates to service a series of requests sent by a hacker by building a dynamic maze honeypot around an information system based on characteristics of the request and the hacker. In an embodiment, honeypot maze program 112 receives, from a rule-based intrusion detection system, an intercepted request sent by a hacker, analyzes the intercepted request to determine, in part, a type of service and a type of hacker, builds a first layer of a honeypot maze based on the analysis of the intercepted request, simulates the first layer of the honeypot maze to the hacker, and iteratively builds additional layers of the honeypot maze based on additional intercepted requests from the hacker. In the depicted embodiment, honeypot maze program 112 resides on information system 110 with user interface 122 being the local app interface of honeypot maze program 112 on computing device 120. In other embodiments, honeypot maze program 112 may reside on another device (not shown) provided that honeypot maze program 112 has access to network 105. Honeypot maze program 112 is described in more detail below with reference to FIG. 2.

Database 114 operates as a repository for data received, used, and/or output by honeypot maze program 112. Data received, used, and/or generated may include, but is not limited to, requests intercepted from a rule-based intrusion detection system, metadata of the requests, etc. In an embodiment, database 114 is accessed by information system 110 and/or honeypot maze program 112 to store and/or to access the data. Database 114 can be implemented with any type of storage device capable of storing data and configuration files that can be accessed and utilized by information system 110, such as a hard disk drive, a database server, or a flash memory. In the depicted embodiment, database 114 resides on information system 110. In another embodiment, database 114 may reside on another computing device, server, cloud server, or spread across multiple devices elsewhere (not shown) within distributed data processing environment 100, provided that database 114 has access to network 105.

In an embodiment, database 114 includes a vulnerability database of known security vulnerabilities, in which the known vulnerabilities come from crowdsourcing, as known to a person of skill in the art. In another embodiment, database 114 includes access to a vulnerability database as known to a person of skill in the art. In an embodiment, the vulnerability database provides metadata about known security vulnerabilities including, but not limited to, date of discovery, affected products, severity, difficulty, involved communication ports, typical paths, executable/library names, and specific strings.

Computing device 120 operates as a computing device associated with a user determined to be a hacker that is trying to get information from information system 110. In an embodiment, computing device 120 is associated with one or more users. In some embodiments, computing device 120 can be a standalone computing device, a management server, a web server, a mobile computing device, or any other electronic device or computing system capable of receiving, sending, and processing data. In some embodiments, computing device 120 may be a laptop computer, tablet computer, netbook computer, personal computer (PC), a desktop computer, a smart phone, or any programmable electronic device capable of communicating with information system 110 and/or production environment 130 via network 105. Computing device 120 may include components as described in further detail in FIG. 4.

User interface 122 operates as a local user interface on computing device 120 through which one or more users of computing device 120 interact with computing device 120. In an embodiment, user interface 122 operates as a local app interface of honeypot maze program 112 on computing device 120. In some embodiments, user interface 122 is a graphical user interface (GUI), a web user interface (WUI), and/or a voice user interface (VUI) that can display (i.e., visually), present (i.e., audibly), and/or enable a user to enter or receive information (i.e., graphics, text, and/or sound) for or from honeypot maze program 112 via network 105. In an embodiment, user interface 122 enables a user to send and receive data (i.e., to and from honeypot maze program 112 via network 105, respectively).

Figure 2:
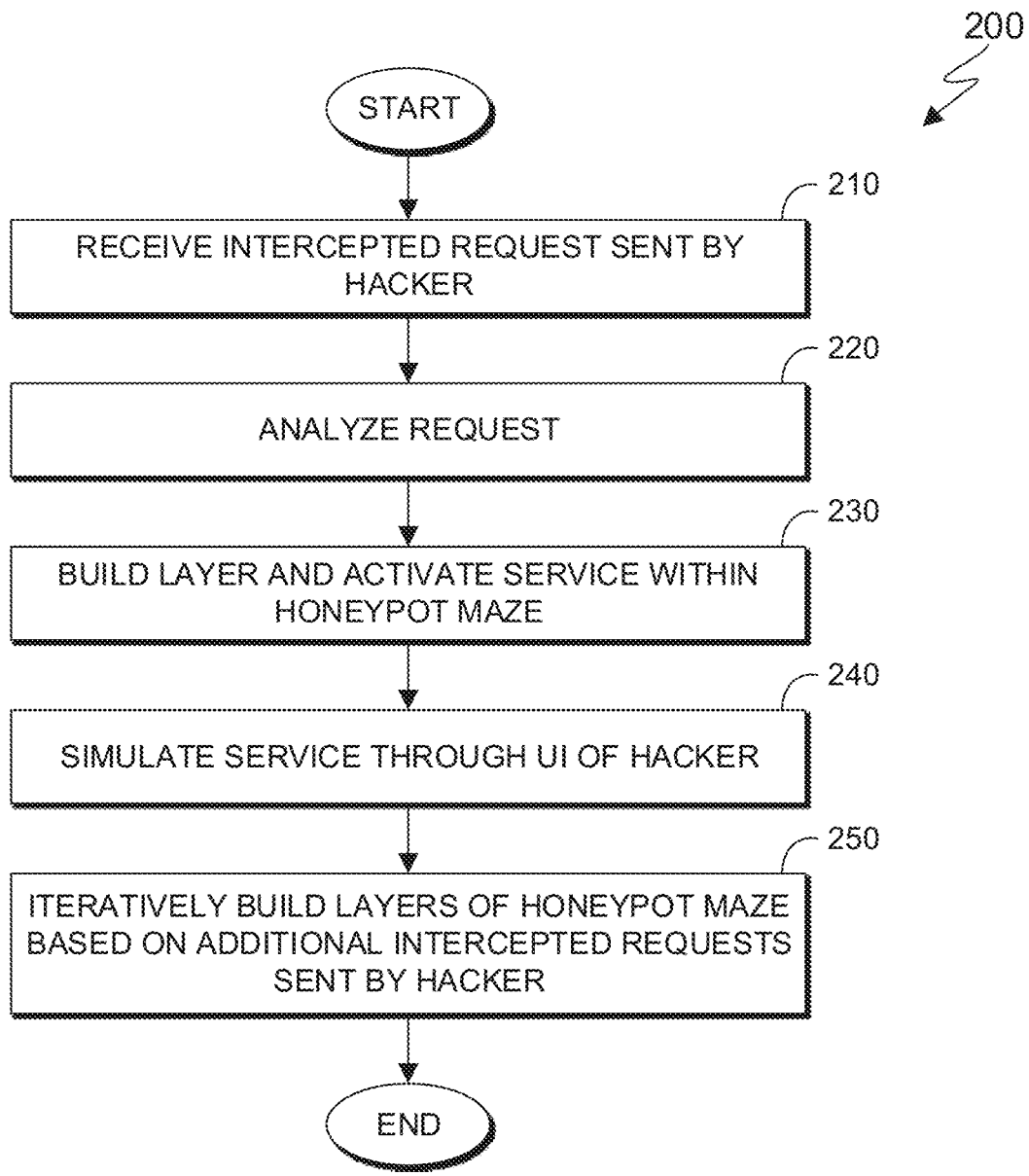
FIG. 2 is a flowchart depicting operational steps of a honeypot maze program, on a server computer within the data processing environment of FIG. 1, for servicing a series of requests sent by a hacker by building a dynamic maze honeypot based on characteristics of the request and the hacker, in accordance with an embodiment of the present invention.

FIG. 2 depicts a flowchart 200 of the steps of honeypot maze program 112, in accordance with an embodiment of the present invention. In the depicted embodiment, honeypot maze program 112 receives, from a rule-based intrusion detection system, a plurality of intercepted requests sent by a hacker and builds a dynamic maze honeypot of services around a production information system based on characteristics of the request and the hacker. It should be appreciated that the process depicted in FIG. 2 illustrates one possible iteration of honeypot maze program 112, which can be repeated for each different hacker detected.

In step 210, honeypot maze program 112 receives an intercepted request sent by a hacker. In an embodiment, honeypot maze program 112 receives the intercepted request from a rule-based intrusion detection system (IDS), as known to a person of skill in the art, that is within distributed data processing environment 100 and used by information system 110 as a part of its security system. In an embodiment, honeypot maze program 112 receives an intercepted request when the IDS detects uncommon behavior or access to unpublished resources, e.g., a port, ip, url, or service. In an embodiment, honeypot maze program 112 receives an intercepted request sent by a hacker and addressed to an information system. For example, honeypot maze program 112 receives an intercepted request sent by a hacker of computing device 120 through user interface 122 and addressed to production information system 110.

In step 220, honeypot maze program 112 analyzes the intercepted request. In an embodiment, honeypot maze program 112 analyzes the intercepted request to determine a service type of a service the hacker is most likely try to hack to get information from information system 110. A service type includes, but is not limited to, an application service type, a database service type, a file sharing service type, and an email service type. In an embodiment, honeypot maze program 112 analyzes an address included in the intercepted request by monitoring packets at the network traffic level, i.e., checking which addresses and ports are requested and which protocol is used by the hacker, in which the address includes at least one of a transport layer protocol port number, a uniform resource locator (URL), or a path included in a URL.

In an embodiment, honeypot maze program 112 analyzes the intercepted request to determine a type of hacker the hacker is. In an embodiment, honeypot maze program 112 analyzes credential information included in the intercepted request to determine a type of hacker. Types of hacker include a human hacker or a bot hacker. In an embodiment, honeypot maze program 112 characterizes the hacker as a human hacker or a bot hacker based on typical activity of a human hacker versus a bot hacker. For example, trying default passwords is typical of a bot hacker, while using stolen credentials is typical of a human hacker. In another example, wide port-scanning is typical of a bot hacker, while direct lookup of services is typical of a human hacker.

In an embodiment, if honeypot maze program 112 correlates behavior of the hacker with specific security vulnerabilities from a vulnerability database, honeypot maze program 112 can determine an expertise level of the hacker (i.e., searching for vulnerabilities that are defined as "difficult to exploit") and a currentness or up-to-dateness of knowledge of the hacker (i.e., searching for vulnerabilities that have recently been made public).

In an embodiment, honeypot maze program 112 utilizes metadata stored in vulnerability database, e.g., database 114, to create relationships between security vulnerabilities and group the security vulnerabilities into high level groups, e.g., web servers are grouped with standard operating system, "web", "demon"; scripting frameworks are grouped with "web", "webapp", specific scripting language. In an embodiment, for each observed element (i.e., port scanned, path entered, URL visited, etc.), honeypot maze program 112 raises a score for a related group. In an embodiment, honeypot maze program 112 determines a target of the hacker based on high scored groups.

In step 230, honeypot maze program 112 builds a layer of a honeypot maze and activates a service within a honeypot maze based on the analyzed intercepted request. In an embodiment, in a first iteration with a hacker, honeypot maze program 112 builds a first layer of a honeypot maze based on the analyzed intercepted request, in which the first layer of the honeypot maze includes available services corresponding to the service type and/or type of hacker determined from analyzing the request. In an embodiment, honeypot maze program 112 activates a first service by selecting a microservice image from a set of microservice images based on the analyzed intercepted request and instantiating the microservice image.

In step 240, honeypot maze program 112 simulates the first layer of the honeypot maze through a user interface of the computing device of the hacker, in which the first layer of the honeypot maze provisions a first microservice or shows available services corresponding to the analyzed intercepted request.

In step 250, honeypot maze program 112 iteratively builds additional layers of the honeypot maze based on additional intercepted requests sent by the hacker. In an embodiment, honeypot maze program 112 iteratively builds additional layers of the honeypot maze by provisioning new microservices and leveraging an SDN approach for quick provisioning. In an embodiment, honeypot maze program 112 continuously (and on-demand) expands and changes (in terms of VLANs, hosts, services, and/or ports) the honeypot maze by leveraging SDN for quick provisioning in response to additional requests intercepted from the hacker. In an embodiment, honeypot maze program 112 iteratively determines additional layers to build and services to provision based on analyzing additional intercepted requests and activating additional services within the honeypot maze.

FIG. 3 is an exemplary table depicting hacker skill profiles and corresponding honeypot mazes to build. In an embodiment in which honeypot maze program 112 identifies that port 80 has been scanned by a hacker, honeypot maze program 112 determines that the hacker is targeting a Web server service, and thus, honeypot maze program 112 determines that the hacker is an HTTP attacker. In an embodiment, based on determining the hacker skill profile to be an HTTP attacker, honeypot maze program 112 provisions an Apache Web server with a known vulnerability as the honeypot. In an embodiment in which honeypot maze program 112 identifies that port 22 has been scanned by a hacker, honeypot maze program 112 determines that the hacker is targeting a Secure Shell (SSH) service, and thus, honeypot maze program 112 determines that the hacker is a Command Shell attacker. In an embodiment, based on determining the hacker skill profile to be Command Shell attacker, honeypot maze program 112 provisions a Docker container with SSH vulnerability as the honeypot.

Figure 4:
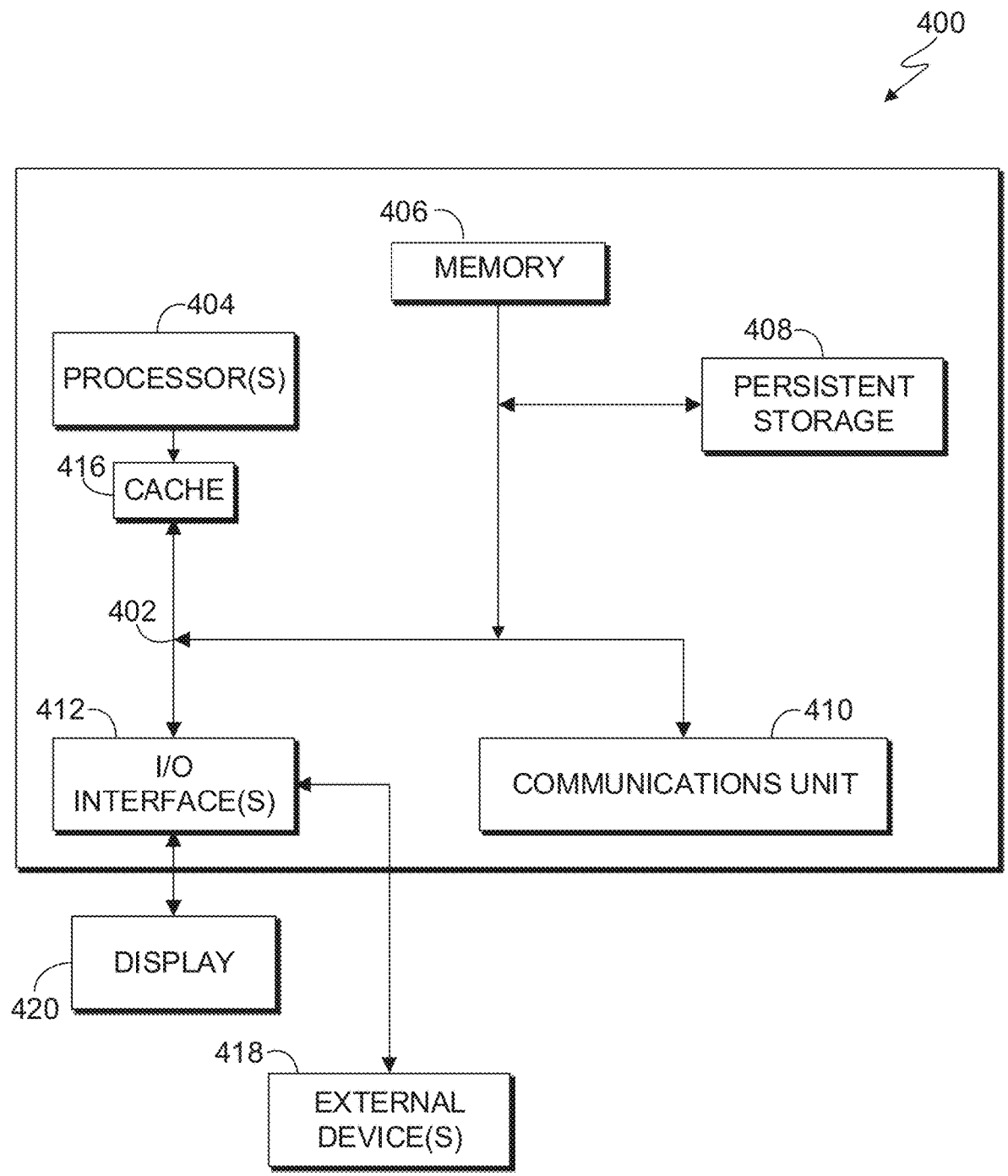
FIG. 4 is a block diagram of components of the server computer executing the honeypot maze program, in accordance with an embodiment of the present invention.

FIG. 4 depicts a block diagram of components of computing device 400 suitable for server 110 and/or computing device 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 400 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Honeypot maze program 112 may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Honeypot maze program 112 may be downloaded to persistent storage 408 through communications unit 410.

I/O interface(s) 412 allows for input and output of data with other devices that may be connected to computing device 400. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., honeypot maze program 112, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by one or more processors, from a rule-based intrusion detection system, an intercepted request sent by a hacker;
   responsive to receiving the intercepted request, analyzing, by the one or more processors, the intercepted request to determine, in part, a type of service and a type of hacker;
   responsive to analyzing the intercepted request, building, by the one or more processors, an initial layer of a honeypot maze that includes at least one service corresponding to the service type and the type of hacker from the analyzed intercepted request;
   responsive to building the initial layer of the honeypot maze, simulating, by the one or more processors, the initial layer of the honeypot maze to the hacker; and
   iteratively building, by the one or more processors, additional layers of the honeypot maze based on additional intercepted requests from the hacker using a Software-Defined Networking (SDN) approach.

2. The computer-implemented method of claim 1, wherein the type of hacker is selected from the group consisting of a human hacker and a bot hacker.

3. The computer-implemented method of claim 1, wherein analyzing the intercepted request to determine, in part, the type of service and the type of hacker comprises:
   determining, by the one or more processors, the type of hacker by analyzing credential information included in the intercepted request.

4. The computer-implemented method of claim 1, wherein analyzing the intercepted request to determine, in part, the type of service and the type of hacker comprises:
   correlating, by the one or more processors, behavior of the hacker with known security vulnerabilities; and
   determining, by the one or more processors, an expertise level of the hacker and a currentness of knowledge of the hacker based on the known security vulnerabilities.

5. The computer-implemented method of claim 4, wherein analyzing the intercepted request to determine, in part, the type of service and the type of hacker comprises:
   determining, by the one or more processors, a target of the hacker based on the known security vulnerabilities.

6. The computer-implemented method of claim 1, wherein building the initial layer of the honeypot maze comprises:
   activating, by the one or more processors, a service, based on the type of service and the type of hacker, by selecting a microservice image from a set of microservice images and instantiating the microservice image.

7. The computer-implemented method of claim 1, wherein iteratively building the additional layers of the honeypot maze based on the additional intercepted requests from the hacker further comprises:
  responsive to receiving the additional intercepted requests from the hacker, iteratively building, by the one or more processors, the additional layers of the honeypot maze based on analyzing the additional intercepted requests to determine additional microservices to activate.

8. A computer program product comprising:
  one or more computer readable storage media and program instructions stored on the one or more computer readable storage media, the program instructions comprising:
  program instructions to receive, from a rule-based intrusion detection system, an intercepted request sent by a hacker;
  responsive to the program instructions to receive the intercepted request, program instructions to analyze the intercepted request to determine, in part, a type of service and a type of hacker;
  responsive to the program instructions to analyze the intercepted request, program instructions to build an initial layer of a honeypot maze that includes at least one service corresponding to the service type and the type of hacker from the analyzed intercepted request;
  responsive to the program instructions to build the initial layer of the honeypot maze, program instructions to simulate the initial layer of the honeypot maze to the hacker; and
  program instructions to iteratively build additional layers of the honeypot maze based on additional intercepted requests from the hacker using a Software-Defined Networking (SDN) approach.

9. The computer program product of claim 8, wherein the type of hacker is selected from the group consisting of a human hacker and a bot hacker.

10. The computer program product of claim 8, wherein the program instructions to analyze the intercepted request to determine, in part, the type of service and the type of hacker comprise:
  program instructions to determine the type of hacker by analyzing credential information included in the intercepted request.

11. The computer program product of claim 8, wherein the program instructions to analyze the intercepted request to determine, in part, the type of service and the type of hacker comprise:
  program instructions to correlate behavior of the hacker with known security vulnerabilities; and
  program instructions to determine an expertise level of the hacker and a currentness of knowledge of the hacker based on the known security vulnerabilities.

12. The computer program product of claim 11, wherein analyzing the intercepted request to determine, in part, the type of service and the type of hacker comprises:
  determining, by the one or more processors, a target of the hacker based on the known security vulnerabilities.

13. The computer program product of claim 8, wherein the program instructions to build the initial layer of the honeypot maze comprise:
  program instructions to activate a service, based on the type of service and the type of hacker, by selecting a microservice image from a set of microservice images and instantiating the microservice image.

14. The computer program product of claim 8, wherein the program instructions to iteratively build the additional layers of the honeypot maze based on the additional intercepted requests from the hacker further comprise:
  responsive to receiving the additional intercepted requests from the hacker, program instructions to iteratively build the additional layers of the honeypot maze based on analyzing the additional intercepted requests to determine additional microservices to activate.

15. A computer system comprising:
  one or more computer processors;
  one or more computer readable storage media;
  program instructions stored on the computer readable storage media for execution by at least one of the one or more processors, the program instructions comprising:
  program instructions to receive, from a rule-based intrusion detection system, an intercepted request sent by a hacker;
  responsive to the program instructions to receive the intercepted request, program instructions to analyze the intercepted request to determine, in part, a type of service and a type of hacker;
  responsive to the program instructions to analyze the intercepted request, program instructions to build an initial layer of a honeypot maze that includes at least one service corresponding to the service type and the type of hacker from the analyzed intercepted request;
  responsive to the program instructions to build the initial layer of the honeypot maze, program instructions to simulate the initial layer of the honeypot maze to the hacker; and
  program instructions to iteratively build additional layers of the honeypot maze based on additional intercepted requests from the hacker.

16. The computer system of claim 15, wherein the program instructions to analyze the intercepted request to determine, in part, the type of service and the type of hacker comprise:
  program instructions to determine the type of hacker by analyzing credential information included in the intercepted request.

17. The computer system of claim 15, wherein the program instructions to analyze the intercepted request to determine, in part, the type of service and the type of hacker comprise:
  program instructions to correlate behavior of the hacker with known security vulnerabilities; and
  program instructions to determine an expertise level of the hacker and a currentness of knowledge of the hacker based on the known security vulnerabilities.

18. The computer system of claim 17, wherein analyzing the intercepted request to determine, in part, the type of service and the type of hacker comprises:
  determining, by the one or more processors, a target of the hacker based on the known security vulnerabilities.

19. The computer system of claim 15, wherein the program instructions to build the initial layer of the honeypot maze comprise:
  program instructions to activate a service, based on the type of service and the type of hacker, by selecting a microservice image from a set of microservice images and instantiating the microservice image.

20. The computer system of claim 15, wherein the program instructions to iteratively build the additional layers of the honeypot maze based on the additional intercepted requests from the hacker further comprise:

responsive to receiving the additional intercepted requests from the hacker, program instructions to iteratively build the additional layers of the honeypot maze based on analyzing the additional intercepted requests to determine additional microservices to activate.

* * * * *